(12) United States Patent
Weisbach

(10) Patent No.: US 11,278,836 B2
(45) Date of Patent: *Mar. 22, 2022

(54) FILTER HEADER POCKET CHANNEL FRAME

(71) Applicant: John F. Weisbach, Louisville, KY (US)

(72) Inventor: John F. Weisbach, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,878

(22) Filed: Oct. 15, 2019

(65) Prior Publication Data

US 2020/0114293 A1    Apr. 16, 2020

Related U.S. Application Data

(63) Continuation-in-part of application No. 15/878,249, filed on Jan. 23, 2018, now Pat. No. 10,758,854.

(60) Provisional application No. 62/745,766, filed on Oct. 15, 2018.

(51) Int. Cl.
| | | |
|---|---|---|
| *B01D 53/22* | (2006.01) | |
| *B01D 46/02* | (2006.01) | |
| *B01D 46/00* | (2022.01) | |
| B01D 46/10 | (2006.01) | |
| B01D 46/52 | (2006.01) | |
| B01D 46/06 | (2006.01) | |

(52) U.S. Cl.
CPC ....... *B01D 46/023* (2013.01); *B01D 46/0005* (2013.01); *B01D 46/06* (2013.01); *B01D 46/10* (2013.01); *B01D 46/521* (2013.01); *B01D 2265/028* (2013.01); *B01D 2265/06* (2013.01)

(58) Field of Classification Search
CPC ...... B01D 46/023; B01D 46/10; B01D 46/06; B01D 46/0005; B01D 2265/028; B01D 2265/06; B01D 46/521
See application file for complete search history.

(56) References Cited

U.S. PATENT DOCUMENTS

| | | | | |
|---|---|---|---|---|
| 2,001,307 | A * | 5/1935 | Hiering | A45C 13/04 150/123 |
| 2,347,078 | A * | 4/1944 | Buxton | A24F 27/04 292/281 |
| 2,681,018 | A * | 6/1954 | McClellan | E05G 1/024 109/74 |

(Continued)

*Primary Examiner* — Anthony R Shumate
(74) *Attorney, Agent, or Firm* — Carrithers Law Office, PLLC; David W. Carrithers

(57) ABSTRACT

The pocket channel frame provides a means for attaching the distal ends of a pocket frame without the need of any tools. The pocket channel frame is formed from a longitudinal member having an elongated "C" shaped cross section. One end comprises is a flared out female end with a rectangular slot or 5 hole in it. The opposing distal end of the longitudinal having a C shaped cross section is swaged down into a projecting male end including a lance punched in the web. When the male end is swaged, an edge is created in the transition area from male to female which acts as a stop means for cooperatively engaging the female receiving distal end and sets the length of a short side of the pocket channel frame. During assembly, the lance snaps into the hole cooperatively engaging the slot on the 10 female side preventing the channel frame from coming back apart.

3 Claims, 9 Drawing Sheets

(56) References Cited

U.S. PATENT DOCUMENTS

| | | | | |
|---|---|---|---|---|
| 2,692,427 | A | * | 10/1954 | Dettman .................... B67B 7/24 |
| | | | | 30/443 |
| 2,919,912 | A | * | 1/1960 | Brinkhaus .............. B21D 39/03 |
| | | | | 269/47 |
| 3,002,176 | A | * | 9/1961 | Yopp ...................... H01R 13/26 |
| | | | | 439/680 |
| 3,061,334 | A | * | 10/1962 | Everett .................. B60D 1/583 |
| | | | | 280/513 |
| 3,138,658 | A | | 6/1964 | Weimer |
| 3,786,687 | A | * | 1/1974 | Gasner .................... F16H 55/30 |
| | | | | 474/158 |
| 3,807,147 | A | | 4/1974 | Schoonen |
| 3,962,795 | A | | 6/1976 | Ross |
| 4,033,214 | A | | 7/1977 | Pearl |
| 4,065,199 | A | | 12/1977 | Andre |
| 4,101,108 | A | | 7/1978 | Klein |
| 4,300,927 | A | | 11/1981 | Day |
| 4,312,648 | A | | 1/1982 | Day |
| 4,325,718 | A | | 4/1982 | Burkhead |
| 4,356,011 | A | | 10/1982 | Day |
| 4,508,319 | A | | 4/1985 | Tappan |
| 4,941,805 | A | | 7/1990 | Matthews |
| 5,343,592 | A | | 9/1994 | Parise |
| 5,365,609 | A | * | 11/1994 | Herzog ...................... A45F 5/02 |
| | | | | 2/161.4 |
| 5,554,203 | A | | 9/1996 | Borkent et al. |
| 5,695,535 | A | | 12/1997 | Hintenlang et al. |
| 6,131,356 | A | | 10/2000 | Gieseke |
| 6,394,030 | B1 | * | 5/2002 | Geiger ................. A01K 39/014 |
| | | | | 119/57.8 |
| 6,445,541 | B1 | | 9/2002 | Boutaghou |
| 6,451,079 | B1 | | 9/2002 | Lange et al. |
| 7,128,771 | B2 | | 10/2006 | Harden |
| 7,229,265 | B1 | * | 6/2007 | Lemkin ............... B29C 45/2606 |
| | | | | 425/107 |
| 7,886,494 | B1 | | 2/2011 | Schott |
| 8,029,585 | B2 | | 10/2011 | Sundvik et al. |
| 8,105,409 | B2 | | 1/2012 | Mann et al. |
| 8,518,136 | B2 | | 8/2013 | Weise |
| 8,632,043 | B2 | * | 1/2014 | Dahlbacka ............. B60N 2/075 |
| | | | | 248/424 |
| 8,690,980 | B2 | | 4/2014 | Eyers et al. |
| 8,764,871 | B2 | | 7/2014 | Dralle |
| 9,067,159 | B2 | | 6/2015 | Soderhom et al. |
| 2004/0260198 | A1 | | 12/2004 | Rothberg |
| 2005/0195529 | A1 | | 9/2005 | Tsuchida |
| 2007/0199888 | A1 | | 8/2007 | Japp |
| 2007/0251168 | A1 | | 11/2007 | Turner |
| 2009/0031682 | A1 | | 2/2009 | Derek et al. |
| 2009/0049811 | A1 | | 2/2009 | Choi |
| 2009/0100813 | A1 | | 4/2009 | Iddings |
| 2009/0107088 | A1 | | 4/2009 | Sundivik |
| 2009/0172951 | A1 | | 7/2009 | Frank |
| 2010/0126124 | A1 | | 5/2010 | Scott |
| 2013/0074463 | A1 | | 3/2013 | Kulkarni |
| 2013/0263744 | A1 | | 10/2013 | Osendorf |
| 2015/0101298 | A1 | | 4/2015 | Osendorf |
| 2015/0128540 | A1 | | 5/2015 | Eyers |
| 2016/0375382 | A1 | | 12/2016 | Girondi |
| 2017/0229799 | A1 | | 8/2017 | Little |

* cited by examiner

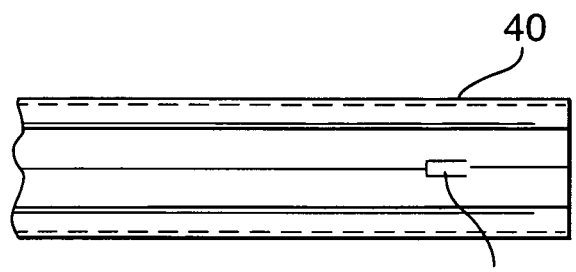
FIG. 20
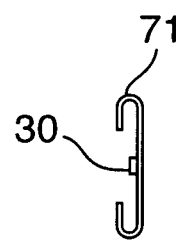
FIG. 24
FIG. 22
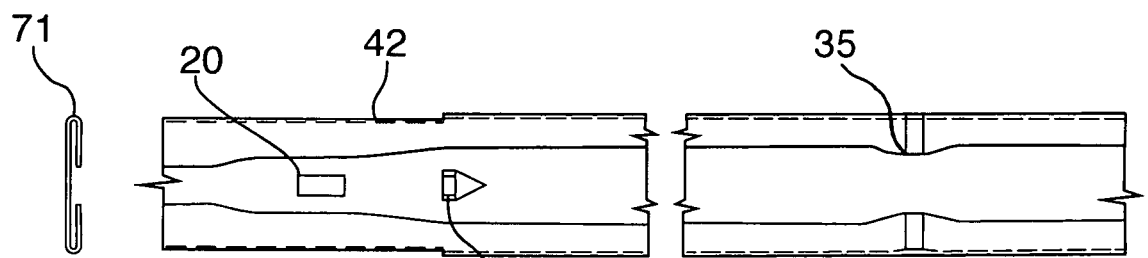
FIG. 25
FIG. 21
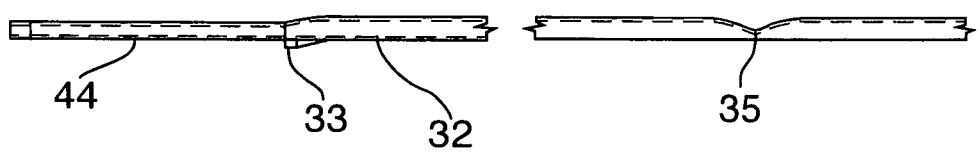
FIG. 23

FILTER HEADER POCKET CHANNEL FRAME

CROSS REFERENCES TO RELATED APPLICATIONS

This is a continuation-in-part application of U.S. application Ser. No. 15/878,249 filed on Jan. 23, 2018 and claims priority from U.S. Provisional Application Ser. No. 62/746,766 filed on Oct. 15, 2018 both of which are hereby incorporated by reference herein in their entirety.

TECHNICAL FIELD

The present invention relates to the field of pocket filter assemblies for supporting filter media bags for removing solids from air or gaseous mediums wherein multiple bag filter elements held together in a pocket channel frame are supported by a rectangular header frame.

BACKGROUND OF THE INVENTION

Typically, a filter cartridge is fixed across the interior of a gas duct so that particulate materials are removed from the gas stream flowing through the interior of each of the filter pockets. When it becomes necessary to replace the filter media in the filter cartridge, the entire cartridge is removed and thrown away and a new cartridge installed in its place.

A common type of air filter referred to as a pocket filter cartridge generally includes a plurality of relatively flat wedge-shaped filter bags fastened to a common mounting frame so that the cartridge includes a series of filter pockets suspended from the frame in adjacent side-by-side relation and resembling a stack of books or an accordion. Pocket filter assemblies having at least one and typically a plurality of filter bags, each having an open end attaching to a rectangular flat pocket frame fastened inside the open end of the bag. The pocket frames are fastened together, side by side, and then the pocket frame and bag assembly is supported by a filter frame header wherein the pocket frame is inserted into an inward facing channel of a corresponding sized and shaped main header frame. The header frame is made from a longitudinal channel having three miters spaced out along the channel and a fourth miter at one end. The three miters are bent at right angles with the U-channel facing inward.

U.S. Pat. No. 4,356,011 incorporated by reference herein in its entirety teaches a typical pocket filter assembly. A pocket filter cartridge for removing solid particulate from a dirty gas stream including a plurality of sheath-like filter bags suspended from a common header assembly in side-by-side relation. Each of the filter bags includes a plurality of alternating rows of filamentary stays or span stitching spaced across the width of the bag and extending generally parallel to one another along its length so that upon inflation of the bag by the dirty gas stream during use, the stays shape the bag into a plurality of adjacent tube-like sections opening into one another within the bag. The stays in each row are sized to be of a different length than the stays in the rows adjacent to it to alternately vary the thickness of the bag at the juncture of the tube-like sections formed in the bag.

Typically, one or more of the filter cartridges are secured across the interior of a gas duct so that particulate materials are separated from the gas stream as it flows through the filter media from the interior of each of the filter pockets. When it becomes necessary to replace the filter media in the filter cartridge, the entire cartridge is removed and thrown away and a new cartridge installed in its place.

In filter arrangements of this type, it is necessary to minimize contact between the adjacent filter bags to maintain a uniform flow of gases through the filters as well as to effectively utilize the entire area of the filter media in the filter bags. If this is not done, there can be a substantial pressure loss in the air stream as it flows through the filter cartridge with an attendant increase in the energy required to operate the system. One way of doing this has been to sew the opposing walls of each of the filter bags together so that the filter assumes the shape of a series of separate, adjacent tube-like sections upon its inflation by the gas stream during use. However, while that type of arrangement has proven to be very effective in maintaining separation between the adjacent filter bags, the filter media proximate each of the seams is unavailable for filtering and thus larger and bulkier filters have generally been required. Other arrangements have maintained separation between the adjacent filter bags by shaping them in a tapered or wedge-like configuration. This approach has also proven effective but similarly has required the use of larger filters as well as being relatively difficult to manufacture.

One preferred filter cartridge assembly includes a plurality of relatively flat, sheath-like filter bags suspended from a generally rectangular header assembly in side-by-side relation. Each of the filter bags is assembled from a pair of generally rectangular panels or sheets of flexible filter media sewn together on three sides to form the closed downstream end of the bag and open on the remaining side to form the mouth of the bag which is secured to the header assembly. The filter bag includes a plurality of alternating rows of filamentary stays or span stitching spaced across the width of the bag and extending generally parallel to one another along its length so that upon inflation of the bag by the dirty gas stream during use, the stays shape the bag into a plurality of adjacent tube-like sections opening into one another within the bag. This relatively compact and easily fabricated arrangement effectively maximizes the surface area of the filter media available for filtration while at the same time maintaining sufficient separation between the bags to minimize pressure losses in the gas stream flowing through the filter cartridge.

In this type of filter arrangement, it is necessary to minimize contact between adjacent filter bags to maintain a uniform flow of gases through the filters as well as to effectively utilize the entire area of the filter media in the filter bags. Otherwise, there can be a substantial reduction of air speed through the filter cartridge and an increase in the amount of energy required to propel air through the system. One way of doing this has been to sew the opposing walls of each of the filter bags together to maintain the shape of the filter assembly to resemble tube-like sections when inflated by the gas stream during use. However, while that type of arrangement is very effective in maintaining separation between the adjacent filter bags, the filter media around each of the seams is unavailable for filtering thus reducing filter efficiency. Other arrangements have maintained separation between the adjacent filter bags by shaping them in a tapered or wedge-like configuration. This approach has also proven effective but similarly requires the use of larger filters which are relatively difficult to manufacture.

A conventional header assembly includes a generally rectangular frame and a plurality of elongated rectangular collars, each of which is aligned in the mouth of one of the filter bags and supported within the frame to secure the filter bags to the header assembly. After the collars are positioned in the filter bags, they are secured together by rivets so that the filter media forming the mouth of each of the filter bags is clamped between the adjacent collars as shown in prior art FIG. 1. Thereafter, the four legs of the frame are secured about the outermost ends and sides of the collars so that the outermost portions of the filter bags are clamped between the legs of the frame and the collars to complete the assembly.

U.S. Pat. No. 4,356,011 teaches a multi-bag filter cartridge with a main frame holding the wedge shaped bags in a side-by-side arrangement. US Patent Publication No. 201300744636 teaches a filter element for filtering fluids wherein the filter element includes a plurality of wedge shaped sections in a side-by-side arrangement with an outer frame comprising an upper channel member and a lower channel member.

Most companies currently assemble pocket frames by a "pierce and roll" fastening method which is basically a stapler like device without staples which pierces the metal then rolls the metal back on itself as shown in FIG. 3.

SUMMARY OF THE INVENTION

The pocket channel frame fastening device in the present invention provides a mechanism to attach the free distal ends of the pocket channel frame without the need of any tools. The pocket channel frame assembly of the present invention comprises a pocket channel frame for insertion inside of a header channel frame or other filter channel frames whereby a series of pocket channel frames are nested together in a side by side arrangement. Each one of the pocket frames are formed by strips of material folded into a rectangle and overlapped on one side and fastened therein. The filter media pockets are wrapped around them and the pocket channel frames and filters slide into position within the header frame which is filled with a selected number of pocket channel frames using a fastening means such as described in U.S. patent application Ser. No. 15/878,249 filed on Jan. 23, 2018 for a Filter Frame Header Locking Device and is incorporated herein by reference.

The pocket channel frame comprises a sub-frame for use with a header frame. The pocket channel frame comprises of a longitudinal U-channel having three miters spaced out along the channel and a fourth miter at one end contains a plurality of filter bags, each having an open end attached to a rectangular pocket channel frame fastened inside the open end of the bag. The pocket channel frames are fastened together, side by side, and then the pocket channel frame and bag assembly is supported in the U shaped longitudinal channel of the filter frame header wherein the pocket channel frame is inserted into an inward facing channel of a corresponding sized and shaped main header frame.

The pocket channel frame comprises a longitudinal member with a transverse extended C-shaped cross-section. The longitudinal member has four spaced apart crimps where the member is bent to form the rectangular pocket channel frame. A first one of the two free ends is swaged flat and has a medial aperture formed therein. The second free end has a tang located so that when the first end is pushed into the C-shaped hollow, the tang catches in the aperture and holds the channel frame together.

The header assembly and pocket channel frame supports a filter cartridge assembly provided for removing particulate matter from a stream of gas passing through a filter comprising a plurality of filter bags held open by in improved header frame assembly and pocket channel frame comprising rectangular pocket channel frames supporting and holding the plurality of filter bags in position. The plurality of generally wedge shaped filter bags each has one open end containing a rectangular flat ring forming a pocket channel frame. The pocket channel frame securely holds the open end of the bag fully open.

The plurality of filter bags are aligned in a side-by-side arrangement with the flat pocket frames being parallel to and adjacent to one another and the pocket channel frames are rigidly fastened to one another, thus forming a rectangular filter bag and pocket channel frame assembly. The main frame surrounds and rigidly grasps the filter bag and pocket channel frame assembly. The main frame comprises a longitudinal channel member coined or having three internal miters formed therein at spaced apart intervals and an end miter at a first free end. The channel is deformed at an angle of ninety degrees at each internal miter thus forming a rectangular main frame. The open side of the channel faces toward the center of the rectangular main frame.

Each of the pocket channel frames comprises a longitudinal member with a long C-shaped cross-section. The longitudinal member has four spaced apart crimps allowing ninety degree bends forming corners of a rectangle to be formed. The first end of the member has a tang formed in a medial area near the end. The second free end is flattened and swaged allowing insertion into the C-shaped void of the first free end. A rectangular aperture is formed in a medial position which receives the tang of the first free end. Also, during the swaging process of the second free end, outwards extending lugs are formed which create a stop for limiting how much the second free end is allowed to penetrate into the first free end.

The novelty of the present invention is based on a modification of existing filter media pocket channel frames for pocket filters providing means for connecting the distal ends of a longitudinal channel member without the need for tools and allowing the part to be shipped in straight lengths. Conventional pocket frames are typically formed by a pierce and roll method wherein rectangular shaped forms and the two overlapping ends are pierced with a square wedge shaped pin and the resulting lug is bent over like one leg of a staple to secure the two ends of the pocket frame together.

Another approach employs two square pins side by side, which pierce the over lapping ends of the longitudinal member with the resulting two lugs being bent over like the two legs of a staple. The present invention does away with the piercing and bending of a lug formed in the 5 piercing of the longitudinal member. The sliding of the swaged second free end into a C-shaped channel slot of the first free end of the longitudinal member provides a stronger connection and therefore a stronger pocket channel frame. The tang of the first free end snaps into the rectangular aperture to hold the second free end within the C-shaped slot of the first free end, thus holding the two ends secure to one another.

Furthermore, the longitudinal members with a C-shaped cross-section, four crimps, with one free end having a medial inward facing tang and the other free end being swaged flat with a medial rectangular aperture can be easily stored and delivered as long and straight members before bending and forming the longitudinal members into rectangular pocket channel frames. When needed, the longitudinal members can be bent and the two free ends snapped together manually without the use of any tools, whereas, the prior art pocket frames require a piercing and bending tool to form the longitudinal members into a rectangular pocket channel frame.

It is an object of this invention to provide a multi-bag filter cartridge including a main rectangular channel frame holding the wedge-shaped bags together in a side-by side arrangement and wherein open end of the bags is held open by rectangular pocket channel frames which are fastened together to form the filter element held with the filter cartridge and are held within an inward facing U-shaped channel within the rectangular main frame.

It is an object of this invention to provide a multi-bag filter cartridge including a main rectangular frame holding the wedge-shaped bags together wherein the rectangular main frame is a longitudinal channel with three spaced apart miters allowing the channel to be bent at the three miters and the resulting two ends of the channel are fastened together to form a rectangular frame with the open side of the channel facing towards the center of the frame.

It is an object of this invention to provide a multi-bag filter cartridge including a main rectangular frame holding the wedge-shaped bags with rectangular pocket channel frames wherein the pocket channel frames comprise longitudinal members with a C-shaped cross-section, four crimps, with the first free end having a medial inward facing tang and the second free end being swaged flat and provided with a medial rectangular aperture thus allowing manual bending of the longitudinal member at the crimps to form a rectangular pocket channel frame, and wherein the second free end is pushed into the C-shaped void of the first free end until the medial inward facing tang snaps into the rectangular aperture in the first free end.

It is an object of this invention to provide the multi-bag filter cartridge above wherein the swaging process of the second free end of the longitudinal member forming the pocket channel frames also creates outward extending lugs forming stops which prevent the second free end from being pushed too far into the C-shaped void of the first free end.

It is an object to provide a pocket channel frame to hold filters for cooperative engagement with a header frame described in U.S. Patent Publication 201802218902.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 20 shows a top view of an embodiment with the first free distal female end of the longitudinal member forming the pocket channel frame with a aperture formed in a medial position of the first free end;

FIG. 21 is top view of the embodiment of FIG. 20 with the second distal free end of the male longitudinal member forming the tongue of pocket channel frame wherein a pierced and formed lover in the web of the male end forms a bump for cooperative engagement with the aperture formed in the female end to cooperatively engage the male end;

FIG. 22 is an edge view of the embodiment of FIG. 20 showing the first free female end of the longitudinal member forming the pocket channel frame;

FIG. 23 is an edge view of the embodiment of FIG. 20 showing the second free male end of the longitudinal member forming the pocket channel frame showing the stop bump which extends below the surface of the channel base and showing the coining at the bend lines;

FIG. 24 is an end view of the embodiment of FIG. 20 showing the male end of the pocket channel frame showing the stop means;

FIG. 25 is an end view of the of the embodiment of FIG. 20 showing a first free female end of the longitudinal member;

DESCRIPTION OF THE PREFERRED EMBODIMENT

Figure 1:
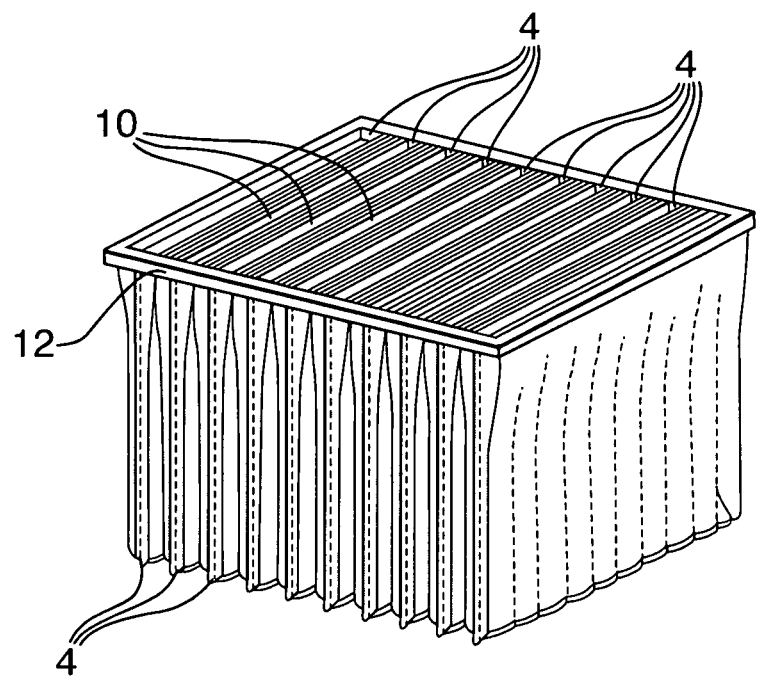
FIG. 1 is a perspective view of the prior art pocket filter.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Filter assemblies usually include a plurality of pocket channel frame assemblies wherein each one supports a filter bag having an open end attached to a pocket channel frame comprising a rectangular flat pocket channel frame 10 fastened inside the open end of the bag. The pocket channel frames 10 are fastened together, side by side, and then the pocket channel frame and bag assembly is supported by a filter frame header 12 wherein the pocket channel frames are inserted into an inward facing U-shaped channel of a corresponding sized and shaped main header frame 12 such as is described pending U.S. Patent Publication 201802218902. The header frame is made from a longitudinal channel having miters spaced out along the channel and a distal end. The inner miters are bent at right angles with the U-channel facing inward. The filter frame header locking device holds the ends of the header frame together after installation of the pocket channel frames.

The pocket channel frame provides a means for attaching the distal ends of a pocket channel frame without the need of any tools. The pocket channel frame is formed from a longitudinal member having an elongated "C" shaped cross section. One end comprises is a flared out female end with a rectangular slot or hole in it. The opposing distal end of the longitudinal having a C shaped cross section is swaged down into a projecting male end including a lance punched in the web. When the male end is swaged, an edge is created in the transition area from male to female which acts as a stop means for cooperatively engaging the female receiving distal end and sets the length of a short side of the pocket frame. During assembly, the lance snaps into the hole cooperatively engaging the slot on the female side preventing the frame from coming back apart.

As shown in FIGS. 4-19, the pocket filter pocket channel frame 11 comprises a longitudinal member 10 with a C-shaped cross section and including four spaced apart transverse crimps 28 allowing easy bending of the longitudinal member 10 at four corners to form a rectangular frame. The open side of the C-shaped cross-section faces inward with respect to the rectangular pocket channel frame 11.

As shown in the FIGS. 9-19, the pocket channel frame comprises a longitudinal channel member(s) 10 having cooperatively engaging free ends, a projecting male end 40 and female receiving end 42. The longitudinal channel member 10 comprises a generally flat base channel 70 formed having spaced apart opposed extending curved channel sidewalls 71. The folded or curled over 180 degrees forming curved sidewall portion 71 of the channel member 10 is spaced apart a selected distance from the channel base and extends inwardly forming flanges 74 terminating in having opposing side edges 73 of the longitudinal channel 10.

The sidewalls 71 are formed or bent at about a 180 degree angle extending inwardly spaced apart and aligned with one another for a selected distance about ⅓ of the distance across the longitudinal channel base 70 forming opposing flanges or shoulders 74. It is contemplated that the shoulders 74 could be formed separately from the channel as an insertable 10 member held in the channel by a friction fit, adhesive, soldering, welding, or other attachment means. The shoulders can be any desired length or depth.

The longitudinal channel member 10 includes a first male end forming a tab 42 for cooperatively engaging a second female end defining an opposing channel receiving end 40. The 15 male end includes at least one lateral lanced portion forming inwardly raised transverse flange at a selected position such as in the center of the channel base or web forming an upwardly projecting lip for cooperative engagement with at least one slot formed in the surface of the opposing distal end of the receiving end of the longitudinal channel member for cooperative engagement therewith.

In one preferred embodiment, an inward facing tang 20 is formed in a medial position of the 20 first free end 40 about one inch from the end. The free end of the tang 20 faces away from the first free end 40. The second free end 42 of the longitudinal member 10 has a flattened portion 44 and a rectangular aperture 22 has been formed in the medial area thereof, also about one inch from the end. Outward extending lugs or ears 32 and 34 have been swaged to provide a positive stop when the first free end 42 is inserted into the C-shaped void of the second free end 40. The edge of the C-shaped 25 channel comes against the lugs 32 and 34 at the same time the tang 20 snaps into the aperture 22.

Figure 2:
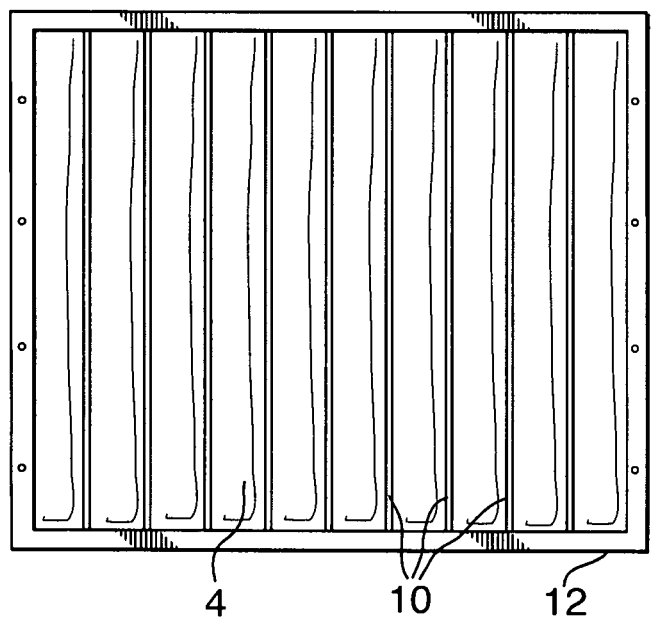
FIG. 2 is a top perspective view of the pocket filter of the present invention.
Figure 3:
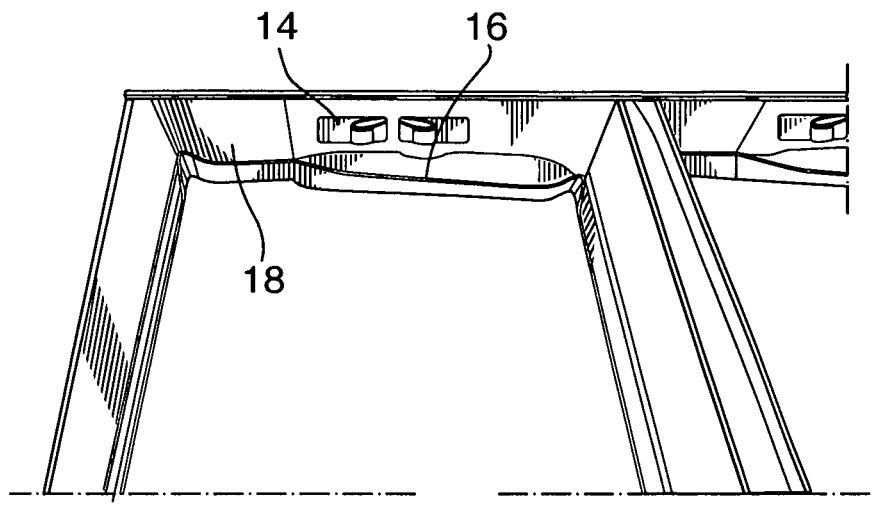
FIG. 3 shows one end of a prior art pocket channel frame assembly wherein a "pierce and roll"
fastening method is used to pierce the metal then rolls the metal back on itself.
Figure 4:
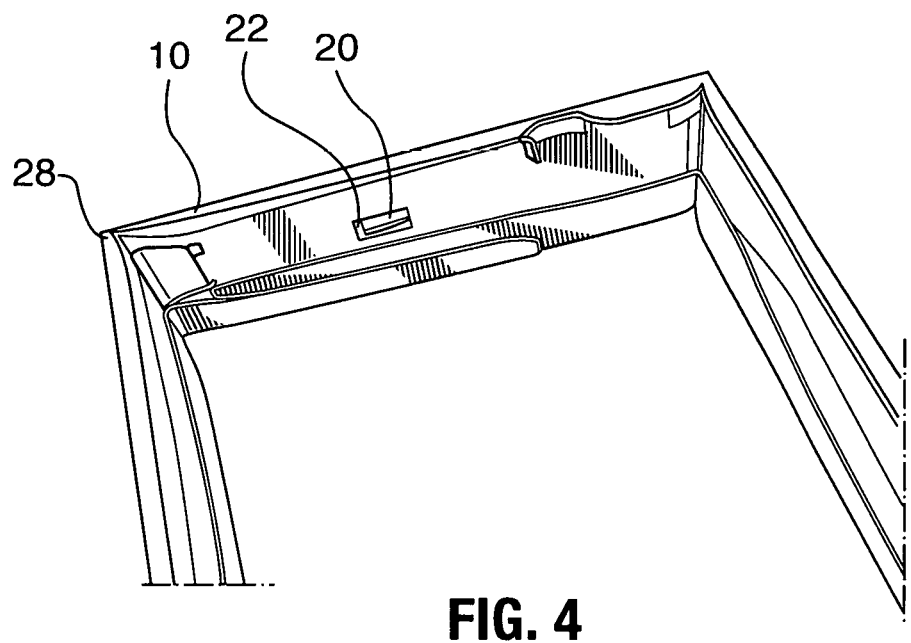
FIG. 4 is an inner perspective view of joined free ends of the pocket channel frame of the present invention.
Figure 5:
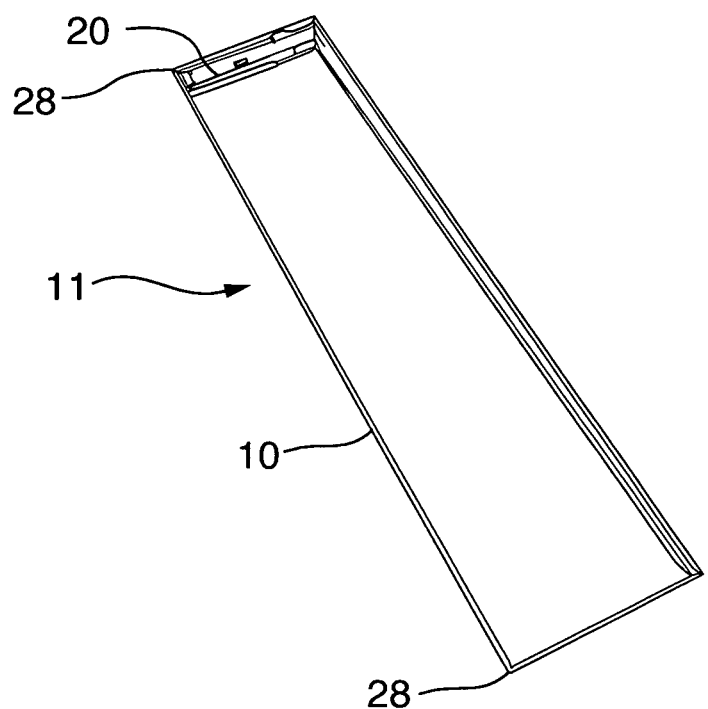
FIG. 5 is a perspective view of the pocket channel frame.
Figure 6:
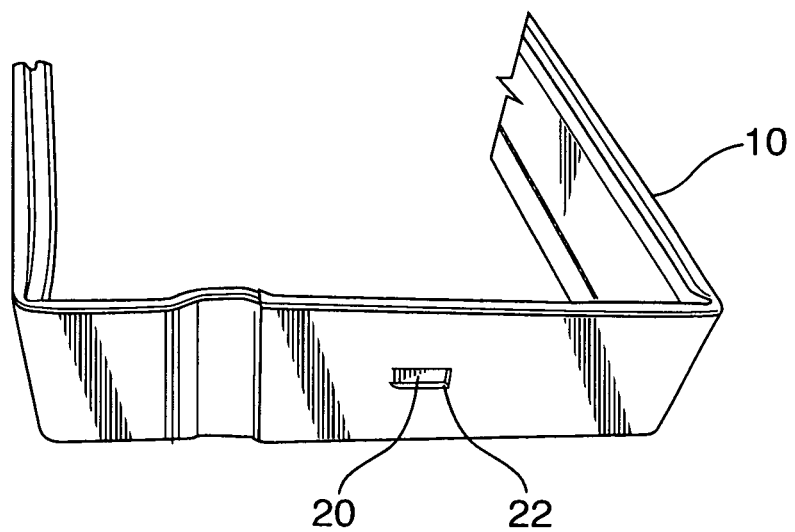
FIG. 6 is an outside view of the joined free ends of the pocket channel frame.
Figure 7:
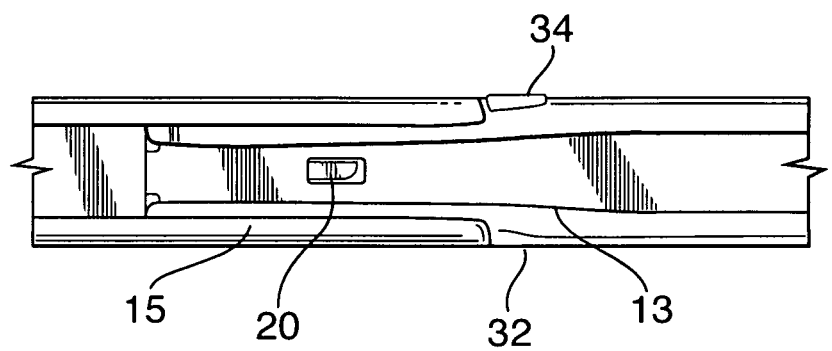
FIG. 7 is an inside view of the two free ends assembled.
Figure 8:
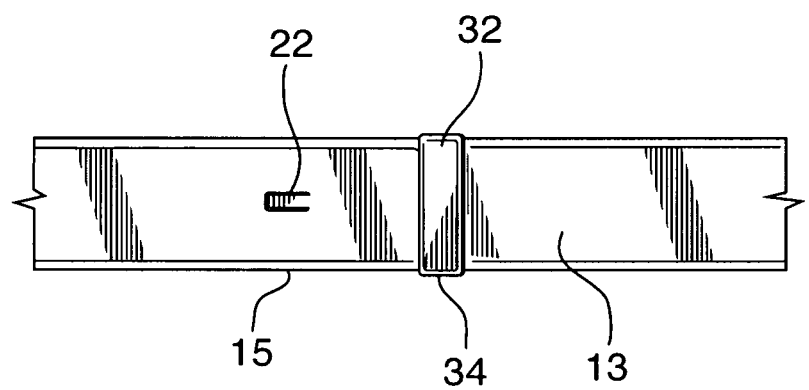
FIG. 8 is an outside view of the two free ends assembled.
Figure 9:
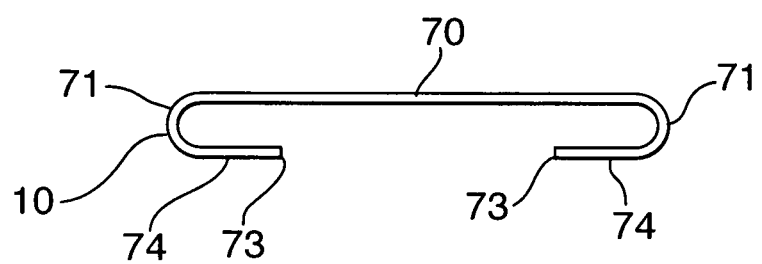
FIG. 9 is a view of the cross-section of the longitudinal member forming the pocket channel frame.
Figure 11:
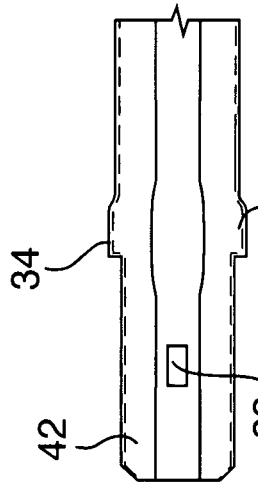
FIG. 11 is a view of the second free end of the longitudinal member forming the pocket channel frame.
Figures 15, 16:
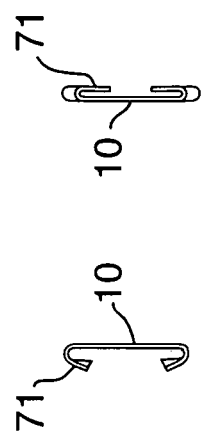
FIG. 15 is an end view of the first free end of the longitudinal member forming the pocket channel frame shown in FIG. 10.
FIG. 16 is an end view of the second free end of the longitudinal member forming the pocket channel frame shown in FIG. 11.
Figure 10:
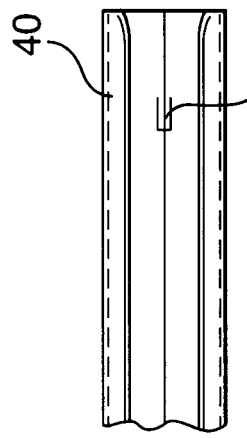
FIG. 10 is a view of the first free end of the longitudinal member forming the pocket channel frame.
Figure 12:
FIG. 12 is an edge view of the first free end of the longitudinal member forming the pocket channel frame.
Figure 13:
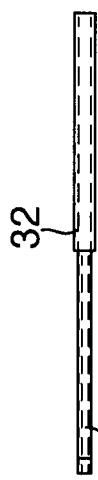
FIG. 13 is an edge view of the second free end of the longitudinal member forming the pocket channel frame.
Figure 19:
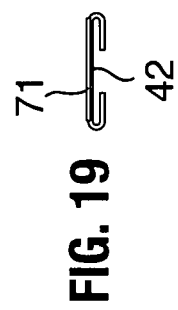
FIG. 19 is a sectional end view showing the flange 42 inserted into the distal end of the channel of the filter channel frame.
Figure 14:
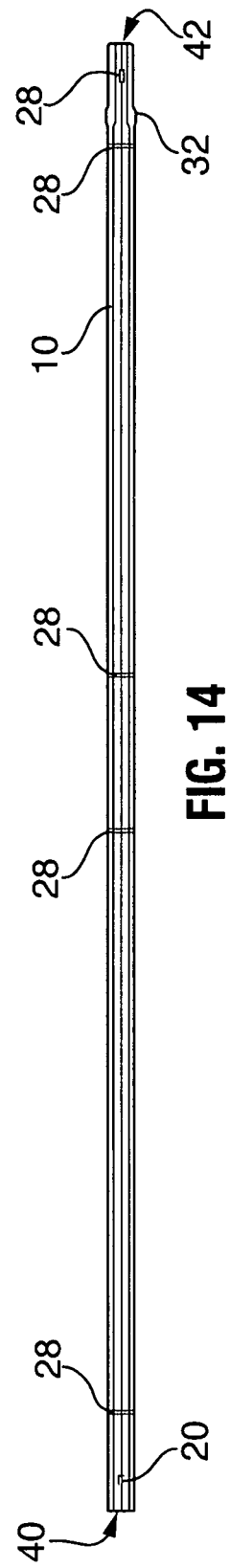
FIG. 14 is a view of the pocket channel frame before being folded into a rectangular shape.
Figure 17:
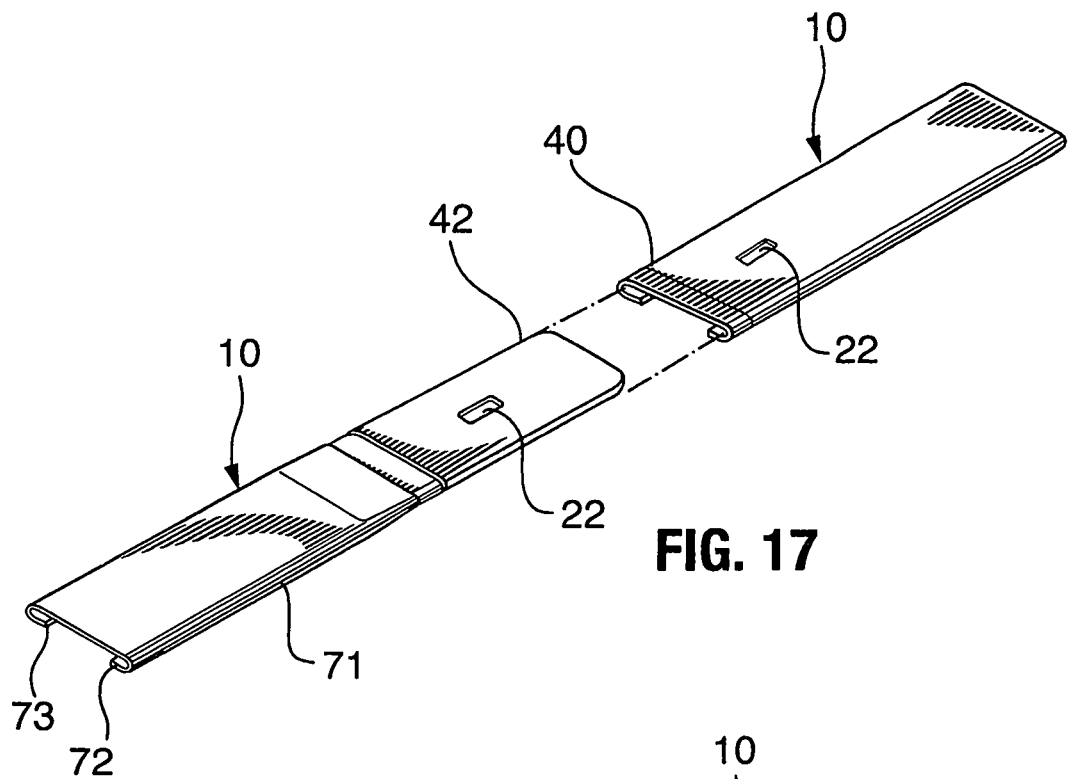
FIG. 17 is a perspective view of the second free end of the longitudinal member forming the pocket channel frame shown in FIG. 11 aligned for joining to the first free end of the longitudinal member forming the pocket channel frame shown in FIG. 10.
Figure 18:
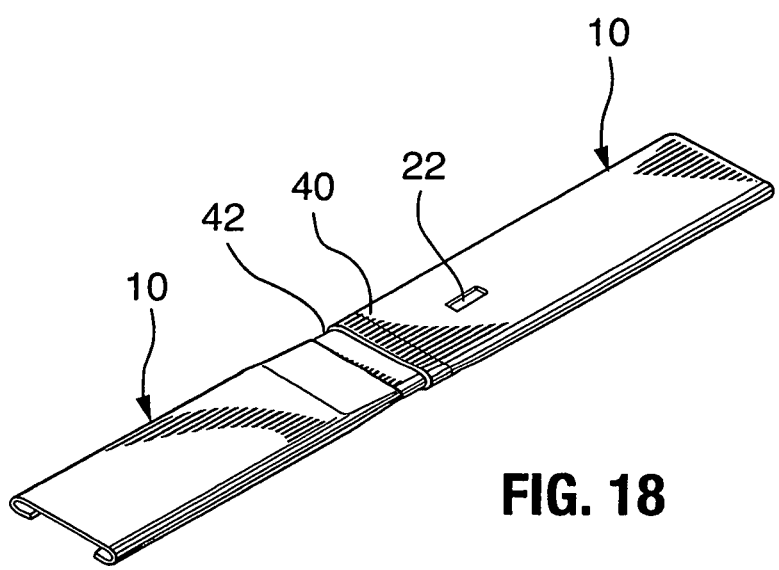
FIG. 18 is a perspective view of the second free end of the longitudinal member forming the pocket channel frame cooperatively engaging the first free end of the longitudinal member forming the pocket channel frame shown in FIG. 10.
Figure 26:
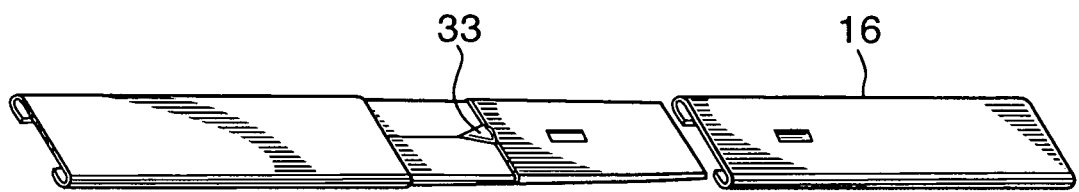
FIG. 26 is a perspective view of the of the embodiment of FIG. 20 showing the second free end of the longitudinal member forming the pocket channel frame cooperatively engaging the first free end of the longitudinal member forming the pocket channel frame.
Figure 27:
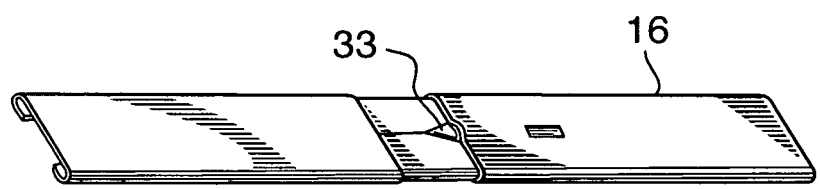
FIG. 27 is a perspective view of the second free end of the embodiment of FIG. 20 of the longitudinal member forming the pocket channel frame shown in FIG. 11 aligned for joining to the first free end of the longitudinal member forming the pocket channel frame.
Figure 28:
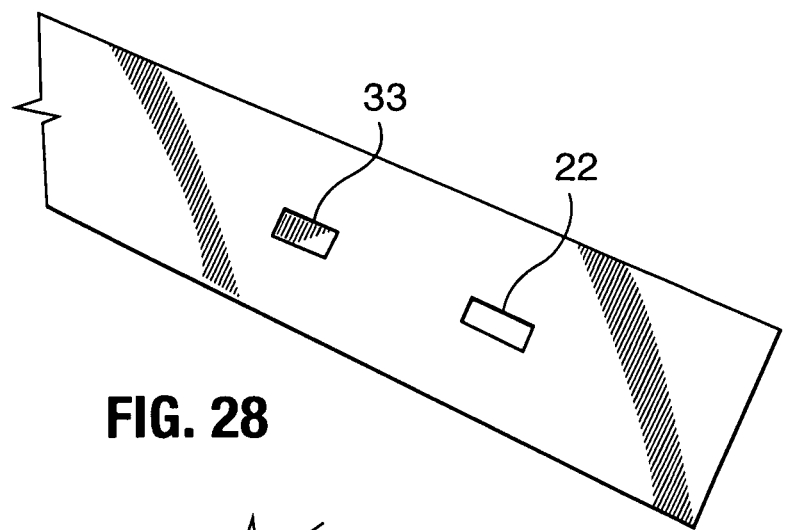
FIG. 28 is a perspective view of the embodiment of FIG. 20 showing the the second free male end of the longitudinal member forming the pocket channel frame with the rectangular aperture and the stop means raised above the level of the channel base.
Figure 29:
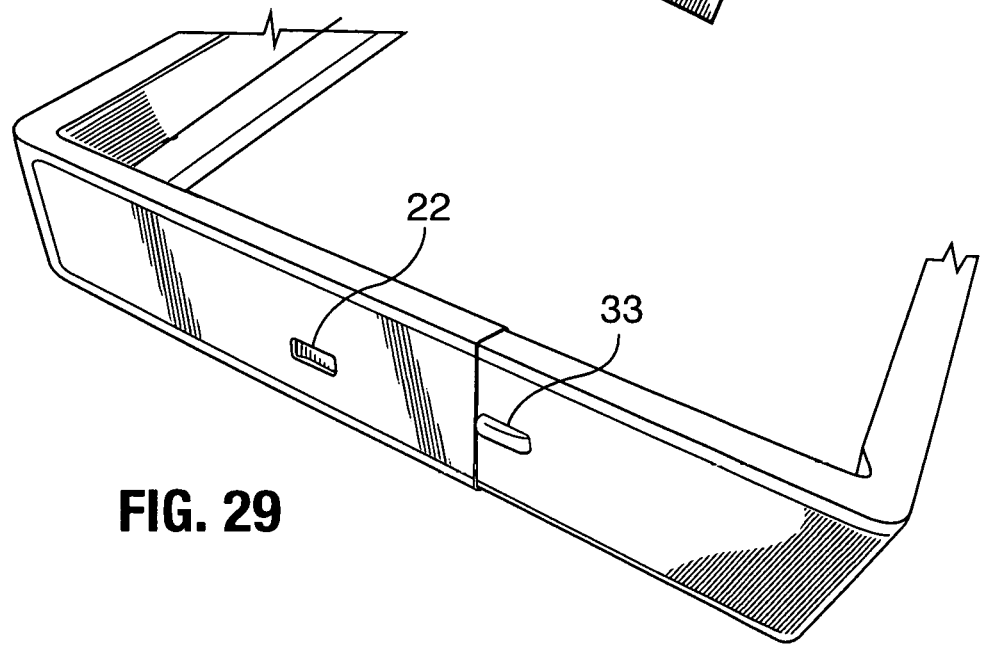
FIG. 29 is a perspective view of the embodiment of FIG. 20 showing the the second free male end of the longitudinal member and first free female end of the longitudinal member in cooperative engagement forming the pocket channel frame with the rectangular aperture and the stop means raised above the level of the channel base.
Figure 30:
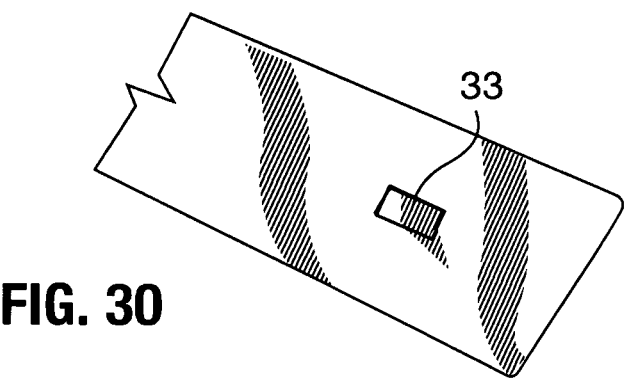
FIG. 30 is a top view of the embodiment of FIG. 20 showing the second free male end of the longitudinal member forming the pocket channel frame with the rectangular aperture and an indention in the top of the channel base forming the stop means.

The crimps 28 are spaced apart to position the ninety degree bends so that the resulting shape 12 with the second end 42 inserted and snapped into the first end 40 is a rectangle as shown in FIG. 5. A plurality of the pocket channel frames 11 are inserted into the wedge shaped bags 4. The pocket channel frames are fastened together and the resulting subassembly is slipped into the U-channel of the main 5 channel frame 12, as shown in FIG. 2.

As shown in FIGS. 20-30 the first free distal female end of the longitudinal member forms the pocket channel frame with a aperture formed in a medial position of the first free end. The second distal free end of the male longitudinal member forming the tongue of pocket channel frame wherein a pierced and formed lover in the web of the male end forms a bump 33 for cooperative engagement with the aperture 30 formed in the female end to cooperatively engage the male end. The second free male end of the longitudinal member forms the pocket channel frame showing the stop bump which extends below the surface of the channel base and showing the coining at the bend lines 35. The second free end of the longitudinal member forming the pocket channel frame cooperatively engaging the first free end of the longitudinal member forming the pocket channel frame. The longitudinal member forms the pocket channel frame by alignment and joining to the first free end of the longitudinal member forming the pocket channel frame. The second free male end of the longitudinal member forms the pocket channel frame with the rectangular aperture and the stop means raised above the level of the channel base and does not depend upon the ears 32, 34 to limit forward movement of the male tongue into the female or receiver end of the channel frame.

The stopping device shown in the embodiments of FIGS. 20-30 include a different stopping device than that shown in FIGS. 4-19 using ears formed out to the sides of the male end in order to abut and stop the edge of the female end when the two were assembled. The embodiment shown in FIGS. 20-30 show the side edge projections replaced with a pierced and formed "louver" in the web or channel base of the male end shown as a bump.

The embodiment shown in FIGS. 4-19 is slightly more difficult to push together to cooperatively engage the male and female ends and occasionally the female end can ride over the "ears" on the male end causing that side of the formed rectangle to be short. The stop means shown in FIGS. 20-30 requires the parts to fit very tightly together at the center of the web where the bump is located.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended 10 to be limited by the specific exemplification presented herein above. Rather, what is intended to be covered is within the spirit and scope of the appended claims.

I claim:

1. A pocket channel frame, comprising:
   a longitudinal channel member having an elongated "C" shaped cross section comprising a generally flat base channel web including spaced apart opposing upwardly extending channel sidewalls, a folded over curved sidewall portion forming flanges having opposing terminating side edges bent at about a selected angle extending inwardly spaced apart and aligned with one another for a selected distance across said longitudinal base channel web defining shoulders; said longitudinal member having an elongated "C" shaped cross section and a first distal end for cooperatively engaging an opposing second distal end;
   said first distal end defining a female receiving end comprising is a flared out portion including at least one slot or hole therein and said portion of said longitudinal channel joining said flared portion forms a stop means cooperatively engaging the female receiving distal end and sets a length of a short side of the pocket channel frame; and
   said second distal end defining a swaged down projecting male end including a lance punched in said channel web wherein assembly includes snapping said lance into said slot or hole cooperatively engaging said slot or hole holding said longitudinal channel together.

2. A pocket filter assembly comprising:
   a plurality of filter bags, each having an open end attached to a rectangular pocket channel frame fastened inside an open end of said bag, said pocket channel frames then fastened together, side by side forming a pocket channel frame and bag assembly, said pocket channel frame and bag assembly supported by a filter frame header comprising a rectangular main frame made from a U-shaped first longitudinal channel of a corresponding sized and shape having three inner miters spaced out along said channel, said inner miters bent at right angles with the U-channel facing inward, two free ends of said first longitudinal U-channel fixedly connected together forming a rectangular main frame; and each of said pocket channel frames comprising a second longitudinal member with a C-shaped cross section and including four spaced apart transverse crimps allowing easy bending of said second longitudinal member at four corners to form a rectangular pocket channel frame, an open side of said C-shaped cross-section facing inward with respect to said rectangular pocket channel frame, said second longitudinal member having a first free end and a second free end, an inward facing tang being formed in a medial position of said first free end about one inch from a proximal edge thereof, a free end of said tang facing away from said proximal edge, a second free end of said second longitudinal member having a flattened portion at least two inches long and having a rectangular aperture formed therein in a medial position thereof, said rectangular aperture about one inch from a distal edge of said second free end and appropriately sized to receive said tang, said second free end having an open void formed therein formed by said C-shaped cross-section, two lugs extending outward from lateral edges of said second end to provide a positive stop when said first free end is inserted into said void, said proximal edge of said first free end contacting said lugs when said tang snaps into said aperture.

3. A pocket filter pocket channel frame comprising:

second longitudinal member with a C-shaped cross-section and including four spaced apart transverse crimps allowing easy bending of said second longitudinal member at four corners to form a rectangular pocket channel frame;

an open side of said C-shaped cross-section facing inward with respect to said rectangular pocket channel frame, said second longitudinal member having a first free end and a second free end;

an inward facing tang being formed in a medial position of said first free end about one inch from a proximal edge thereof, a free end of said tang facing away from said proximal edge;

a second free end of said second longitudinal member having a flattened portion having a rectangular aperture formed therein in a medial position thereof;

said rectangular aperture about one inch from a distal edge of said second free end and appropriately sized to receive said tang;

said second free end having an open void formed therein formed by said C-shaped cross section;

at least one lug extending outward from lateral edges of said second end to provide a positive stop when said first free end is inserted into said void; and said proximal edge of said first free end contacting said lug when said tang snaps into said aperture.

\* \* \* \* \*